United States Patent [19]

Ward et al.

[11] Patent Number: 5,319,012

[45] Date of Patent: Jun. 7, 1994

[54] POLYOLEFIN COMPOSITIONS AND METHOD AND COMPOSITIONS FOR THEIR PREPARATION

[75] Inventors: James J. Ward, Collierville; Thomas E. Breuer, Cordova, both of Tenn.

[73] Assignee: Witco Corporation, New York, N.Y.

[21] Appl. No.: 914,500

[22] Filed: Jul. 15, 1992

Related U.S. Application Data

[62] Division of Ser. No. 683,996, Apr. 11, 1991.

[51] Int. Cl.$^5$ ............................................. C08K 5/09
[52] U.S. Cl. ................................... 524/321; 524/322; 524/583; 524/585
[58] Field of Search ............... 524/321, 322, 300, 583, 524/585

[56] References Cited

U.S. PATENT DOCUMENTS

| | | | |
|---|---|---|---|
| 4,243,581 | 1/1981 | Minagawa et al. | 524/342 |
| 4,829,114 | 5/1989 | Trotoir et al. | 524/247 |

FOREIGN PATENT DOCUMENTS

| | | | |
|---|---|---|---|
| 1029190 | 5/1966 | United Kingdom | 524/321 |

*Primary Examiner*—Melvyn I. Marquis
*Assistant Examiner*—Mark Sweet
*Attorney, Agent, or Firm*—Lockwood, Alex, FitzGibbon & Cummings

[57] ABSTRACT

A method for the nucleation of polyolefins containing residual polymerization catalyst by blending the polyolefins with at least one aliphatic dicarboxylic acid containing from about 4 to about 21 carbon atoms and at least one aliphatic monocarboxylic acid containing from about 8 to about 24 carbon atoms in a weight ratio between about 4:1 and about 1:4. Also a composition comprising at least one aliphatic dicarboxylic acid containing from about 4 to about 21 carbon atoms and at least one aliphatic monocarboxylic acid containing from about 8 to about 24 carbon atoms. The polyolefin product of the nucleation can be molded into shaped articles.

2 Claims, No Drawings

POLYOLEFIN COMPOSITIONS AND METHOD AND COMPOSITIONS FOR THEIR PREPARATION

This application is a divisional, of copending application(s) Ser. No. 683,996, filed Apr. 11, 1991.

FIELD OF THE INVENTION

The present invention relates to polyolefin compositions having improved transparency. It further relates to compositions capable of improving the transparency of polyolefins and to methods of incorporating said compositions into the often translucent polyolefins. An important aspect of the present invention is the nucleation of polyethylene, polypropylene, and copolymers and mixtures thereof with an aliphatic dicarboxylic acid containing from about 4 to about 21 carbon atoms and an aliphatic monocarboxylic acid containing from about 8 to about 24 carbon atoms.

BACKGROUND OF THE INVENTION

Olefin homopolymers and copolymers have become of commercial importance for the manufacturers of numerous shaped articles and other utilities. Unfortunately the olefin homopolymers and copolymers are often translucent due to the crystal structure of the polymer. Improvement in the clarity of the homopolymer and copolymer can be obtained by the use of nucleating agents which enhance nucleation rather than crystal growth during solidification of molten polymer. The use of nucleating agents causes the formation of smaller crystals and accordingly polyolefins having improved clarity and physical properties. In addition the nucleated polyolefins have higher crystallization temperatures. Consequently nucleating materials are of significant importance in improving the value of the polyolefins.

The requirements for an effective nucleating agent are difficult to meet particularly since it must be effective at low concentrations. In order to function as an effective nucleating agent, the compound must be partially insoluble in the polyolefin. On the other hand in order to achieve clarity, the nucleating material must be transparent in the polyolefin at the concentration it is used as a nucleating agent.

Among the other characteristics of a nucleating agent are good thermal stability and the substantial absence of odor, particularly at the melt processing temperatures of the polyolefin. Low melting points and good dispersibility are important in improving mixing of the nucleating compound into the molten polyolefin.

An object of the present invention is a new nucleating agent for polyolefins.

Another object of the present invention is a polyolefin having improved clarity.

Still another object of the present invention is a shaped article from polyolefins which are substantially transparent.

Also an object of the present invention is a method for improving the clarity of polyolefins.

A particular object of the present invention is an improvement in the process for the preparation of polypropylene and polyethylene polymers and copolymers and mixtures thereof which are substantially transparent.

Other objects will become apparent from the ensuing description.

Many materials have been proposed for use as nucleating agents with some success. Among these disclosures are:

U.S. Pat. No. 3,207,735 discloses the use of benzoic acid type compounds to improve the properties of polypropylene.

U.S. Pat. No. 3,207,738 discloses the crystallization of polypropylene using aryl alkanoic acid type compounds.

U.S. Pat. No. 3,268,499 discloses the crystallization of polymers such as polypropylene in the presence of lithium salts of carboxylic acids.

U.S. Pat. No. 3,299,029 discloses the crystallization of polymers such as polypropylene in the presence of aluminum salts of carboxylic acids.

U.S. Pat. No. 3,517,086 discloses aromatic sulfonic acids as nucleating agents.

U.S. Pat. No. 4,704,421 discloses benzoic acid and adipic acid as nucleating agents for propylene polymers.

U.S. Pat. No. 4,801,637 discloses the use of an alcoholic solution of an aromatic carboxylic acid as a nucleating agent for certain crystalline propylene homopolymers or copolymers.

U.S. Pat. No. 4,829,114 discloses a combination of carboxylic acids which contain at least three carbon atoms and an amine such as an ethoxylated amine as nucleating agents for polyolefins.

SUMMARY OF THE INVENTION

The method of the present invention provides for the effective nucleation of polyolefins containing residual polymerization catalyst by blending the polyolefin with an effective amount of a combination of at least one aliphatic dicarboxylic acid containing from about 4 carbon atoms to about 21 carbon atoms and at least one aliphatic monocarboxylic acid containing from about 8 to about 24 carbon atoms wherein the weight ratio of the aliphatic dicarboxylic acid to the aliphatic monocarboxylic acid is between about 4:1 and about 1:4. The present invention further provides compositions comprising at least one aliphatic dicarboxylic acid containing from about 4 carbon atoms to about 21 carbon atoms and at least one monocarboxylic acid containing from about 8 to about 24 carbon atoms in a weight ratio of between about 4:1 and about 1:4.

DETAILED DESCRIPTION OF THE INVENTION

The present invention provides for polyolefins having improved clarity and higher crystallization temperatures. The polyolefins can be homopolymers and copolymers and mixtures thereof which under normal polymerization techniques vary from being translucent to opaque depending upon the polyolefin, the polymerization technique, the thickness of the film or shaped article made therefrom and other factors. Among the polyolefins of this description are ethylene and propylene homopolymers and copolymers. Polyethylene can be low density and high density polymeric material. Linear low density polyethylene is in general a copolymer of ethylene and up to about 10 weight percent of a second olefin, such as propylene, butene, hexene or octene. High density polyethylene is normally a homopolymer.

Propylene polymers are also widely used and are useful in the present invention. They are prepared by well-known processes involving the use of various catalysts, particularly Ziegler-Natta type catalysts, which are highly active and stereospecific. The Ziegler type catalysts may be designated "metal alkyl-reducible metal halide type," and the Natta type catalysts "preformed metal subhalide type." This terminology is used, for example, in "Polyolefin Resin Processes" by Marshall Sittig, Gulf Publishing Company, Houston, Texas, 1961. These well known catalysts are the reaction products of halides, in order of preference chlorides and bromides, of transition metals from subgroups of groups 4 and 5 of the Mendeleeff Periodic Table, as illustrated on page 28 of Ephraim, "Inorganic Chemistry" 6th English Edition, i.e., of Ti, Zr, Hf, Th, V, Nb or Ta, with organo metallic reducing agents in which the metal is from groups 1, 2 or 3. Preferred reducing agents are organoaluminum compounds and particularly aluminum alkyls, including aluminum alkyl halides. The most effective catalysts for the production of isotactic polypropylene known to date are those prepared from certain forms of titanium tetrachloride supported on anhydrous magnesium halide, certain aluminum alkyls, and organic esters.

In the current production of crystallizable alpha olefin polymers, the reaction mixture formed in the low pressure polymerization is treated to deactivate the catalyst. The resulting polymer almost invariably contains at least traces of the catalyst residue. Typically it may contain 10 to 100 parts per million (p.p.m.) of each of the catalyst components, calculated as the corresponding metal. A carefully purified polymer may contain as little as I p.p.m. of each metal or less. In order for the additives of this invention to be fully effective the polymer should contain at least about 25 p.p.m. of the residue of at least one of the catalyst components, calculated as the corresponding metal. Often, these catalysts are comprised of an aluminum alkyl component and a titanium compound supported on magnesium dihalide as a second component. Homopolymers of propylene and copolymers of propylene with other 1-olefins, such as ethylene and butene, and mixtures thereof can be used. Random copolymers of propylene and ethylene containing between about 1 and about 10 weight percent ethylene and mixtures of such random copolymers with a linear low density polyethylene are useful.

The polymerization process can be performed as a liquid or gas phase polymerization process. A slurry process uses a liquid hydrocarbon as a diluent and the polyolefin precipitates from the diluent as it is formed. Saturated hydrocarbons or liquid propylene can be used as the diluent.

A gas phase process can also be used. In this type of process the monomer mixture is introduced into a stirred or fluidized bed of polyolefin particles. About 25 weight percent of the monomer is polymerized each pass through the reactor and the remaining monomer is recycled back into the reactor. This procedure serves to remove the heat of polymerization from the reactor.

Various additives are often generally incorporated into the polyolefin. One such group of additives are antioxidants such as hindered phenols, phenolic phosphites, secondary arylamines and the like. These antioxidants are used in quantities between about 0.01 to about 1 weight percent of the polymer. Other additives such as colorants, antiblocking agents, antistatic agents and lubricants are commonly used.

The method of the present invention results in improved clarity and higher crystallization temperatures for the aforedescribed polyolefins. It comprises melt blending into the polyolefin containing residual polymerization catalyst an effective amount of a combination of at least one aliphatic dicarboxylic acid containing from about 4 to about 21 carbon atoms and at least one aliphatic monocarboxylic acid containing from about 8 to about 24 carbon atoms in a weight ratio between about 4:1 and about 1:4, preferably about 1:1. The monocarboxylic acid and dicarboxylic acid can be added separately to the polyolefin or can be premixed prior to being blended with the polyolefin.

The new compositions of the present invention useful for nucleating polyolefins comprise at least one aliphatic dicarboxylic acid containing from about 4 to about 21 carbon atoms and at least one aliphatic monocarboxylic acid containing from about 10 to about 24 carbon atoms in a weight ratio of between about 4:1 and 1:4, preferably 1:1. While the components in accordance with the present method can be blended separately with the polyolefin, it is preferred that the composition be preprepared by mixing the acids separately and then blending the compositions thus formed with the polyolefin.

Various methods of blending the nucleating composition of the present invention into the polyolefin can be used. The nucleating acids can be melt blended into the polyolefin to form a masterbatch. This masterbatch can then be melt blended with additional polyolefin to obtain the desired concentration of the nucleating agents in the polyolefin.

Variations of this procedure can be followed. For example the components of the present nucleating composition can be mixed in the same masterbatch or in separate masterbatches. The separate masterbatches can be blended into the polyolefin simultaneously or sequentially.

Also the nucleating agents can be dissolved in solvent, such as isopropanol and the solution added to the polyolefin. After evaporation of the solvent, the resulting mixture can be melt blended to nucleate the polyolefin.

The amount of nucleating agent used in the present method will depend upon various factors including but not limited to the identity and properties of the polyolefin; the specific identify of the nucleating agent; the temperature at which the method is performed, etc. In general a minimum of about 0.1 weight percent of the combined weight of aliphatic dicarboxylic acid and aliphatic monocarboxylic acid based on the weight of the polyolefin will suffice in nucleating the polyolefin. While higher amounts can be used, normally there is no significant improvement when there is used more than about 1 weight percent of the combined weight of aliphatic dicarboxylic acid and aliphatic monocarboxylic acid based on the weight of the polyolefin, although the use of higher amounts is within the scope of the present invention.

Exemplary of aliphatic monocarboxylic acids useful in the present invention are oleic acid, stearic acid, behenic acid, myristic acid, pentadecanoic acid, palmitic acid, margaric acid, abletic acid, lauric acid, linoleic acid, ricinoleic acid, hydroxystearic acid, arachidic acid, eicosenoic acid, erucic acid, tetracosenoic acid, elaidic acid and mixtures thereof.

It is of particular value in the present invention to use products of naturally occurring materials. Of particular use are products obtained by the hydrolysis of fats and oils, such as beef tallow, coconut oil, olive oil, palm oil, rapeseed oil, soybean oil and hydrogenated derivatives thereof.

Similarly the aliphatic dicarboxylic acid useful in the present invention can be a single compound or a mixture of aliphatic dicarboxylic acids. Examples of aliphatic dicarboxylic acids useful in the present invention are adipic acid, sebacic acid, succinic acid, suberic acid, dodecanedioic acid and glutaric acid.

The nucleated products of the present invention comprise an olefin polymer, particularly ethylene and propylene homopolymers and copolymers; residual polymerization catalyst; at least one aliphatic dicarboxylic acid containing from about 4 to about 21 carbon atoms and at least one aliphatic monocarboxylic acid containing from about 8 to about 24 carbon atoms. These polyolefin compositions have improved clarity and are often substantially transparent.

Shaped articles according to this invention may be manufactured from the mixtures according to this invention by casting, compression molding or injection molding films may be obtained by blowing or by extrusion; filament, bars, tapes and the like, may be obtained by extrusion. This invention is useful in all other processes involving melting of the polymer followed by solidification.

A series of experiments were performed to determine the effectiveness of the present invention for nucleating polyolefins. The effectiveness of the materials was determined by measuring the haze of polypropylene blended with various nucleating materials.

Haze values were determined by compressing a thin plaque (0.025 inches thick) molded at 220° C. or injection molded at a thickness of 0.050 inches. The haze value of the plaque was measured on a Pacific Scientific XL 211 Hazeguard System. Low haze values indicate high clarity.

Also, were desired, crystallization temperatures were determined by the use of Perkins-Elmer DSC-2 differential scanning calorimeter. In this test a polymer sample is heated to 200° C. and held there for 5 minutes. The sample is then cooled at a rate of 10° C. per minute.

EXAMPLE 1

The test nucleating compounds were blended with Quantum Chemical 8000GK polypropylene (399 grams) by shaking in a plastic bag for two minutes. Each of the mixtures was extruded through a twin screw extruder at 210° C. Then the extrusion was cooled in a water bath and pelletized. This procedure was repeated three time with each mixture and the haze determined with the following results:

| TEST COMPOSITION | | | | |
|---|---|---|---|---|
| Diacid | Amount (Grams) | Monoacid | Amount (Grams) | HAZE |
| — | | — | | 78 |
| Adipic | 1 | — | | 81 |
| — | | Hystrene ® 7018 | 1 | 76 |
| Adipic | 1 | Lauric | 1 | 71 |
| Adipic | 1 | Stearic | 1 | 72 |
| Adipic | 1 | Behenic | 1 | 63 |
| Adipic | 1 | Oleic | 1 | 63 |
| Adipic | 1 | Hystrene ® 7018 | 0.5 | 59 |
| Adipic | 1 | Hystrene ® 7018 | 1 | 64 |
| Adipic | 0.5 | Hystrene ® 7018 | 1.5 | 70 |
| Adipic | 1 | Hystrene ® 7018 | 2 | 68 |
| Adipic | 1 | Hystrene ® 7018 | 3 | 83 |
| Succinic | 1 | — | | 80 |
| Succinic | 1 | Hystrene ® 7018 | 1 | 61 |
| Adipic | 1 | Elaidic | 0.5 | |
| | | Stearic | 0.5 | 59 |

Hystrene 7018 is a mixture of myristic acid (3%), pentadecanoic acid (0.5%), palmitic acid (29%), margaric acid (2%), stearic acid (65%) and oleic acid (0.5%) obtained by the hydrolysis of beef tallow, followed by hydrogenation.

Example 2

The procedures of Example 1 were repeated using different diacids with the following results.

| TEST COMPOSITION | | | | |
|---|---|---|---|---|
| Diacid | Amount (Grams) | Monoacid | Amount (Grams) | HAZE |
| — | | — | | 78 |
| — | | Hystrene ® 7018 | 1 | 76 |
| Glutaric | 1 | — | | 72 |
| Glutaric | 1 | Hystrene ® 7018 | 1 | 45 |
| Azelaic | 1 | — | | 92 |
| Azelaic | 1 | Hystrene ® 7018 | 1 | 67 |
| Suberic | 1 | — | | 73 |
| Suberic | 1 | Hystrene ® 7018 | 1 | 60 |
| Suberic | 1 | Oleic | 1 | 67 |
| Suberic | 1 | Stearic | 1 | 57 |
| Suberic | 1 | Behenic | 1 | 60 |
| Sebacic | 1 | — | | 70 |
| Sebacic | 1 | Hystrene ® 7018 | 1 | 66 |
| Sebacic | 1 | Stearic | 1 | 62 |
| Sebacic | 1 | Behenic | 1 | 57 |
| Dodecane-dioic | 1 | — | | 60 |
| Dodecane-dioic | 1 | Stearic | 1 | 58 |
| Dodecane-dioic | 1 | Behenic | 1 | 57 |
| Adipic Succinic | 0.5 0.5 | Hystrene ® 7018 | 1 | 63 |
| Adipic Suberic | 0.5 0.5 | Hystrene ® 7018 | 1 | 71 |

Example 3 compares the results of using the procedure of Example 1 and mixing two separate masterbatches.

Example 3

A masterbatch of Quantum Chemical 8000 GK polypropylene (380 grams) and a mixture of Hystrene ® 7018 (10 grams) and adipic acid (10 grams) was melt blended in a twin-screw extruder and pelletized. A second masterbatch of the same polypropylene (390 grams) and adipic acid (10 grams) was also melt blended in a twin screw extruder and pelletized. An additional quantity of the polypropylene (360 grams) and the two masterbatches (40 grams of each) were blended and extruded and pelletized three times for each sample. The final blends contained polypropylene (399 grams) and adiptic acid (1 gram) and polypropylene (398 grams), adiptic acid (1 gram) and Hystrene ® (1 gram), respectively. Haze values of compression molded plaques of each sample were determined. These values were compared with haze values of samples prepared in accordance with Example 1, as follows:

| TEST COMPOSITION | | | |
|---|---|---|---|
| | Test Composition | | |
| Preparation Technique | Adipic Acid | Hystrene ® 7018 | HAZE |
| Example 3 | 1 gram | — | 81 |
| Example 3 | 1 gram | 1 gram | 64 |
| Example 1 | 1 gram | — | 60 |
| Example 1 | 1 gram | 1 gram | 48 |

Example 4 demonstrates an alternative procedure for blending the nucleating compounds and polyolefin.

Example 4

8000 GK polypropylene (399 grams) was blended with adipic acid (1 gram) and Hystrene ® 7018 (1 gram) in a plastic bag for one minute. The mixture was extruded and pelletized a total of four times. A second polypropylene blend was prepared, with the adipic acid (1 gram) blended, extruded and pelletized with the polypropylene (399 grams) once, followed by blending with the Hystrene ® 7018 (1 gram) and being extruded and pelletized three times. A third polypropylene blend was prepared with the Hystrene ® 7018 (1 gram) blended with the polypropylene (339 grams), extruded and pelletized once, followed by blending with the adipic acid (1 gram), extruded and pelletized three times. The results of the tests of the samples are as follows:

| First Additive | Second Additive | Crystallization Temp (°C.) | Haze |
|---|---|---|---|
| Components added together | | 124° C. | 60 |
| Adipic Acid | Hystrene ® 7018 | 124° C. | 59 |
| Hystrene ® 7018 | Adipic Acid | 123° C. | 48 |

Example 5

Example 5 was performed with a polypropylene random copolymer prepared in a gas phase process by Eastman Kodak. This copolymer contained 3.2 weight percent ethylene as the comohomer and as residual polymerization catalyst, magnesium (14 ppm) and aluminum (58 ppm). Blends were made of polypropylene copolymer (397 grams). Irganox 1010 (0.8/grams), Irgafos 168 (0.8 grams), sodium carbonate (0.4 grams) and nucleating test compound. Each blend was extruded three times and compression molded samples were tested for haze, with the following results.

| TEST COMPOSITION | | | | |
|---|---|---|---|---|
| Diacid | Amount (gr) | Monoacid | Amount (gr) | HAZE |
| — | | — | | 68 |
| — | | Hystrene ® 7018 | 1 | 67 |
| Adipic | 0.5 | Hystrene ® 7018 | 0.5 | 43 |
| Adipic | 1 | — | | 43 |
| Adipic | 1 | Hystrene ® 7018 | 1 | 38 |
| Adipic | 1 | Hystrene ® 7018 | 2 | 40 |
| Suberic | 1 | — | | 40 |
| Suberic | 1 | Hystrene ® 7018 | 1 | 38 |
| Sebacic | 1 | Hystrene ® 7018 | 1 | 39 |
| Adipic | 1 | Elaidic | 1 | 43 |
| Adipic | 1 | Abietic | 1 | 42 |
| Succinic | 1 | Hystrene ® 7018 | 1 | 47 |

IRGANOX is a trademark for an antioxidant for polyolefins comprising hindered phenol compounds. IRGAFOS is a trademark for a stabilizer containing a phosphorus compound.

Example 6

Example 6 was performed for comparative purposes with de-ashed polypropylene prepared by Eastman Kodak not containing more than a trace of polymerization catalyst residues. Tenite 424 polypropylene contained calcium (29 ppm), magnesium (2 ppm) and aluminum (2 ppm). Pellets were blended with the test nucleating compounds by shaking in a plastic bag for 1 minute. Each mixture was extruded at 200° C. through a twin-screw extruder three times. Compression molded plaques were prepared from each sample and haze values were determined for each sample with the following results:

| TEST COMPOSITION | | | | |
|---|---|---|---|---|
| Diacid | Amount (gr) | Monoacid | Amount (gr) | HAZE |
| — | | — | | 72 |
| — | | Hystrene ® 7018 | 1 | 70 |
| Adipic | 1 | — | | 85 |
| Adipic | 1 | Hystrene ® 7018 | 1 | 97 |
| Suberic | 1 | — | | 74 |
| Suberic | 1 | Hystrene ® 7018 | 1 | 78 |
| Sebacic | 1 | — | | 74 |
| Sebacic | 1 | Hystrene ® 7018 | 1 | 73 |

Example 6 demonstrates the need for residual catalyst in order to obtain improved clarity with the present nucleating compounds.

Example 7

Blends using the procedure of Example 6 were prepared from Union Carbide G-7049 linear low density polyethylene containing magnesium (1 ppm) and aluminum (52 ppm) prepared in a gas phase polymerization process. Each blend was extruded three times. Compression molded plaques were prepared. Haze values were determined for the plaques. Crystallization temperatures of the blends were also measured. The results were as follows:

| TEST COMPOSITION | | | | Crystalline Temp. (°C.) | HAZE |
|---|---|---|---|---|---|
| Diacid | Amount (gr) | Monoacid | Amount (gr) | | |
| — | | — | | 106 | 77 |
| Adipic | 1 | — | | 109 | 48 |
| Adipic | 1 | Hystrene ® 7018 | 1 | 109 | 60 |

As can be seen from the foregoing experimental test results, the method of the present invention results in polyolefin compositions having improved clarity and higher crystallization temperatures. These results were obtained from a variety of polyolefin compositions provided they contained sufficient residual polymerization catalyst. This amount will vary depending upon the identity of the catalyst, the polyolefin and the nucleating agent. In general, levels of residual polymerization catalyst as low as 25 parts per million, or lower, can be sufficient.

The examples demonstrate that various polyolefin compositions can be effectively nucleated in accordance with the present invention. Also demonstrated is that various procedures for blending the polyolefin and nucleating agent can be used without altering the effectiveness of the method. Also the examples establish that the use of the mono- and diacids in accordance with this invention results in product having improved clarity over that obtained using only the monoacid or diacid as a nucleating agent.

It should be understood that embodiments of the present invention have been described are merely illustrative of a few of the applications of the principles of the present invention. Numerous modifications may be made by those skilled in the art without departing from the spirit and scope of the invention.

We claim:

1. A process for nucleating polyolefin compositions which comprises blending at elevated temperatures an a olefin polymer containing residual polymerization catalyst and an effective amount of a combination of at least one dicarboxylic acid containing from about 4 to about 21 carbon atoms and at least one aliphatic monocarboxylic acid selected from the group consisting of oleic acid, stearic acid, behenic acid, myristic acid, abietic acid, lauric acid, linoleic acid, ricinoleic acid, dihydroxystearic acid, arachidic acid, eicosenoic acid, erucic acid, tetracosenoic acid, elaidic acid and mixtures thereof wherein the weight ratio of aliphatic dicarboxylic acid to alphatic monocarboxylic acid is about 1:1.

2. A polymer composition comprising a polyolefin, residual polymerization catalyst, at least one aliphatic dicarboxylic acid containing from 4 to about 21 carbon atoms and at least one alphatic monocarboxylic acid containing from about 8 to about 24 carbon atoms wherein the weight ratio of aliphatic dicarboxylic acid to aliphatic monocarboxylic acid is about 1:1.

* * * * *